(12) United States Patent
Padi et al.

(10) Patent No.: US 10,506,273 B2
(45) Date of Patent: Dec. 10, 2019

(54) USING A MEDIA CLIENT DEVICE TO PRESENT MEDIA CONTENT FROM A MOBILE DEVICE

(71) Applicant: Verizon Patent and Licensing Inc., Arlington, VA (US)

(72) Inventors: Anil Kumar Padi, Flower Mound, TX (US); Kishore Tallapaneni, Flower Mound, TX (US); Prabhakar Mani, Coppell, TX (US); Sankar Ram Dhanabalan, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 45 days.

(21) Appl. No.: 14/331,621

(22) Filed: Jul. 15, 2014

(65) Prior Publication Data

US 2016/0021414 A1 Jan. 21, 2016

(51) Int. Cl.
| | |
|---|---|
| *H04H 60/72* | (2008.01) |
| *H04N 7/16* | (2011.01) |
| *G06F 21/42* | (2013.01) |
| *H04N 21/41* | (2011.01) |
| *H04N 21/4363* | (2011.01) |
| *H04N 21/4627* | (2011.01) |
| *H04N 21/81* | (2011.01) |
| *H04N 21/482* | (2011.01) |
| *H04N 21/422* | (2011.01) |
| *H04N 21/436* | (2011.01) |
| *H04N 21/8355* | (2011.01) |

(Continued)

(52) U.S. Cl.
CPC ..... *H04N 21/4122* (2013.01); *H04N 21/4126* (2013.01); *H04N 21/42204* (2013.01); *H04N 21/43615* (2013.01); *H04N 21/43637* (2013.01); *H04N 21/4627* (2013.01); *H04N 21/482* (2013.01); *H04N 21/8133* (2013.01); *H04N 21/8355* (2013.01); *H04N 21/454* (2013.01)

(58) Field of Classification Search
None
See application file for complete search history.

(56) References Cited

U.S. PATENT DOCUMENTS

| | | | | |
|---|---|---|---|---|
| 8,789,111 B2 * | 7/2014 | Choi | ................. | H04N 7/17318 |
| | | | | 725/109 |
| 9,037,848 B2 * | 5/2015 | Huh | ..................... | H04L 9/0816 |
| | | | | 713/156 |

(Continued)

OTHER PUBLICATIONS

Wikipedia, "Miracast", http://en.wikipedia.org/wiki/Miracast, Jun. 15, 2014, 5 pages.

*Primary Examiner* — Nasser M Goodarzi
*Assistant Examiner* — Terrika Peterson

(57) ABSTRACT

A device is configured to receive media content from a mobile device. The device may receive security information from the mobile device. The security information may indicate a setting for presenting the media content on a display device. The device may store the media content and the security information. The device may receive an instruction to present the media content on the display device. The device may determine whether the media content is permitted to be presented on the display device based on the security information. The device may selectively cause the display device to present the media content based on whether the media content is permitted to be presented on the display device.

20 Claims, 8 Drawing Sheets

(51) Int. Cl.
*G06F 21/16* (2013.01)
*H04N 21/454* (2011.01)

(56) References Cited

U.S. PATENT DOCUMENTS

| | | | |
|---|---|---|---|
| 2003/0105637 A1* | 6/2003 | Rodriguez | G06F 17/2735 704/270 |
| 2003/0229900 A1* | 12/2003 | Reisman | G06F 17/30873 725/87 |
| 2005/0198291 A1* | 9/2005 | Hull | H04L 63/083 709/225 |
| 2007/0067808 A1* | 3/2007 | DaCosta | H04N 7/17318 725/62 |
| 2007/0180485 A1* | 8/2007 | Dua | 725/114 |
| 2009/0144776 A1* | 6/2009 | Walter | H04N 5/44543 725/47 |
| 2009/0210908 A1* | 8/2009 | Sammarco | H04H 60/72 725/48 |
| 2011/0072452 A1* | 3/2011 | Shimy | H04N 7/163 725/25 |
| 2011/0145708 A1* | 6/2011 | Bhogal et al. | 715/716 |
| 2011/0154401 A1* | 6/2011 | Chow | H04N 21/47202 725/49 |
| 2011/0300791 A1* | 12/2011 | Koyama | G08C 17/02 455/39 |
| 2012/0011550 A1* | 1/2012 | Holland | H04N 21/4126 725/78 |
| 2012/0110317 A1* | 5/2012 | Scheer | G06F 17/30038 713/150 |
| 2013/0045681 A1* | 2/2013 | Dua | G06F 17/30058 455/41.1 |
| 2013/0104172 A1* | 4/2013 | Lee et al. | 725/60 |
| 2014/0229959 A1* | 8/2014 | Beckhardt | H04N 21/65 725/5 |
| 2014/0295821 A1* | 10/2014 | Qureshi | H04L 43/04 455/419 |
| 2015/0295767 A1* | 10/2015 | Glazer | H04W 12/06 709/221 |
| 2015/0302218 A1* | 10/2015 | Fielder | G06F 19/322 713/193 |

* cited by examiner

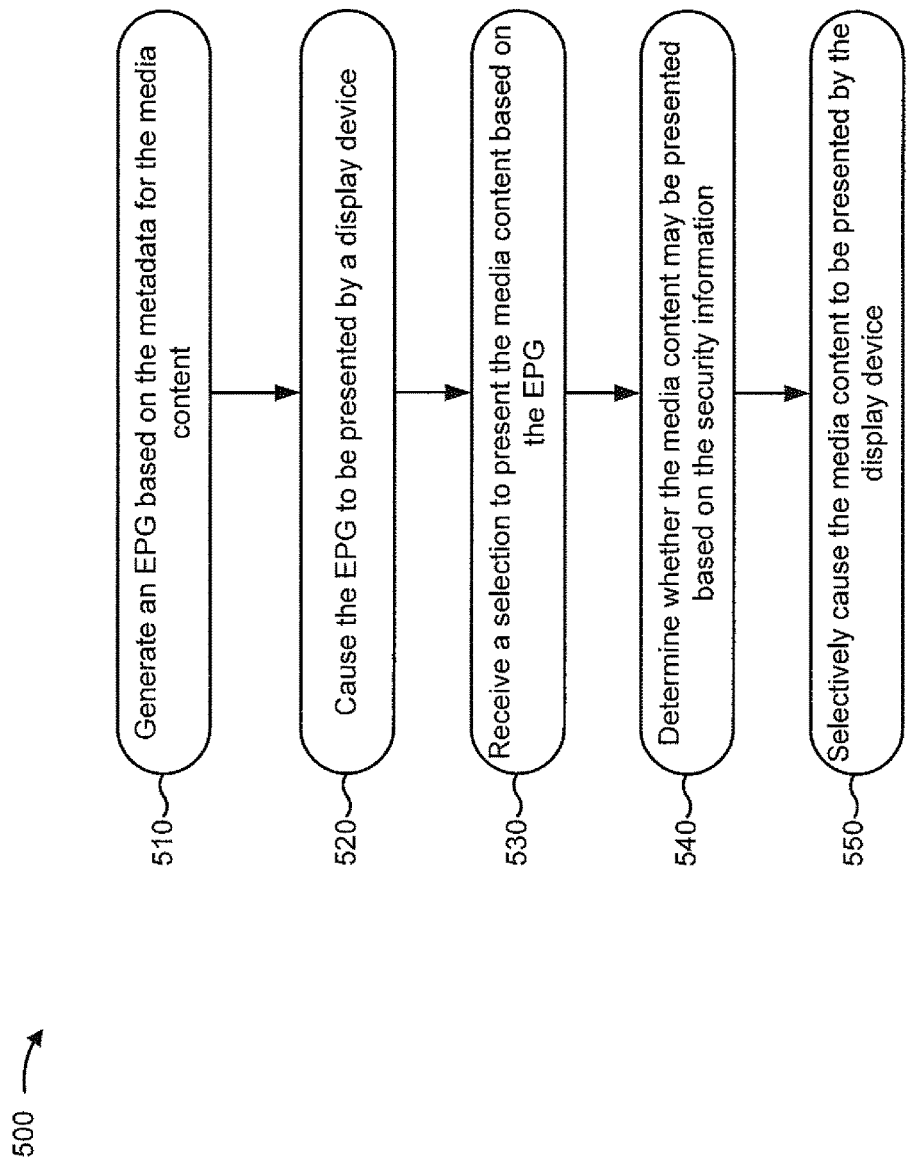

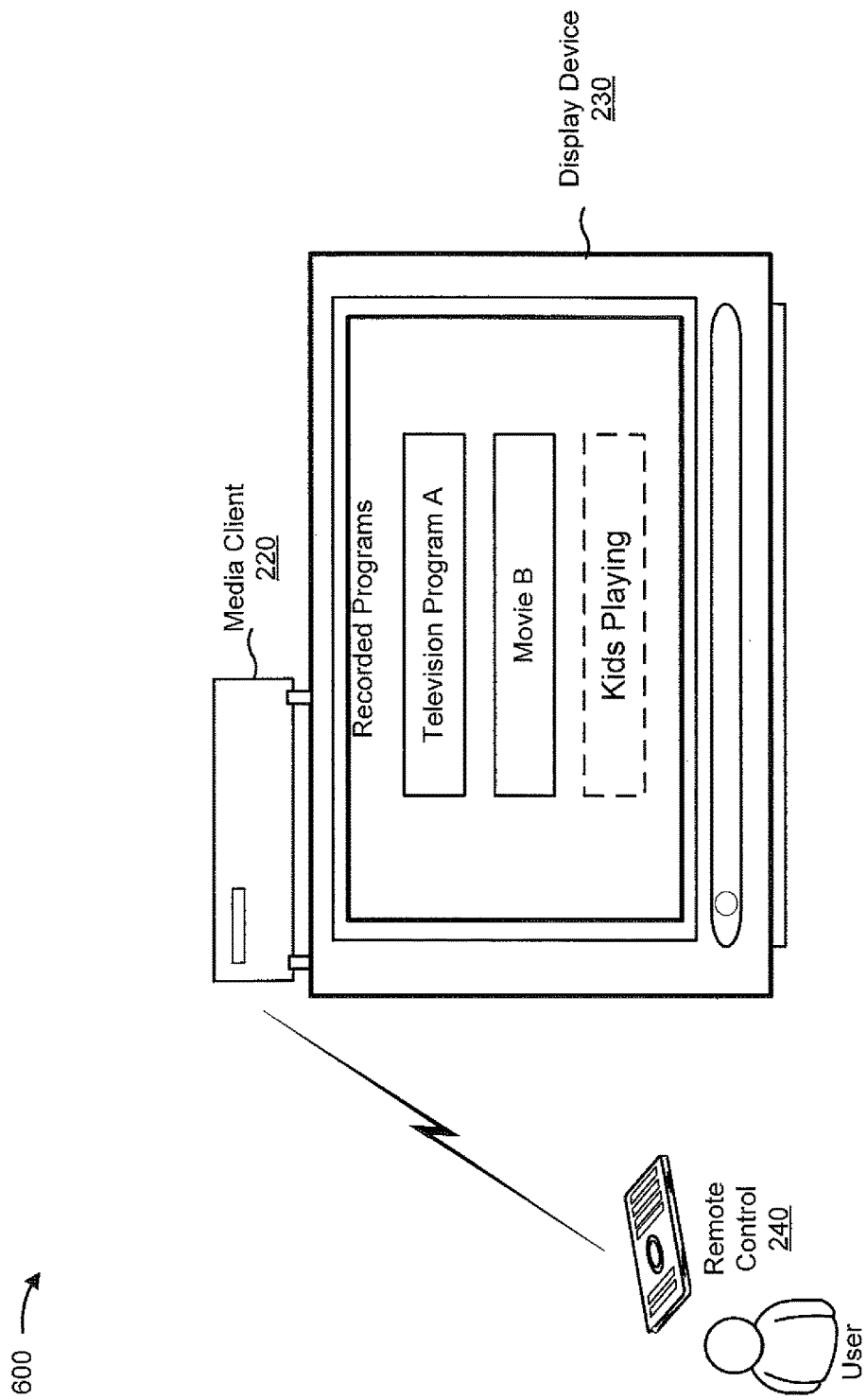

USING A MEDIA CLIENT DEVICE TO PRESENT MEDIA CONTENT FROM A MOBILE DEVICE

BACKGROUND

A set-top box may provide media content to a user. For example, a set-top box may be used to present a television program or on-demand content to a user. The set-top box may receive the media content from a network, such as the Internet. The set-top box may also record media content and store the recorded media content. For example, the set-top box may include a digital video recorder (DVR). Furthermore, the set-top box may support a screen mirroring function that allows the set-top box to mirror a mobile device's screen on another display device (e.g., a television).

BRIEF DESCRIPTION OF THE DRAWINGS

FIG. 5 is a flow chart of an example process for presenting media content received from a mobile device; and FIGS. 6A-6C are diagrams of an example implementation relating to the example processes shown in FIGS. 4 and 5.

DETAILED DESCRIPTION OF PREFERRED EMBODIMENTS

The following detailed description of example implementations refers to the accompanying drawings. The same reference numbers in different drawings may identify the same or similar elements.

A set-top box mirroring a mobile device's screen on another display device (e.g., a television) may allow a user to watch media content on the other display device, but the user may be provided with limited control over display of the media content on the other display device. For example, the user may have to control play back of the media content using the mobile device, and may not be able to use a remote control associated with the set-top box to control play back of the content. Moreover, simply mirroring media content may not provide the user with any information about the media content (e.g., information indicating a title of the media content, a location the media content was recorded, or other metadata). Furthermore, the media content is not stored by the set-top box during the mirroring processes. Thus, a user may not use the set-top box to play back the media content at a later time when the mobile device is not simultaneously presenting the media content on the mobile device's screen.

Implementations described herein may transmit media content and metadata from a mobile device to a media client (e.g., a set-top box) allowing the media client to store the media content and the metadata. Additionally, or alternatively, implementations described herein may allow a remote control associated with the media client to control play back of the media content received from the mobile device. Moreover, implementations described herein may generate an electronic program guide (EPG), based on the metadata for the media content, to be presented to a user. Furthermore, implementations described herein may allow the media client to present the media content without the mobile device simultaneously presenting the media content.

Figure 1:
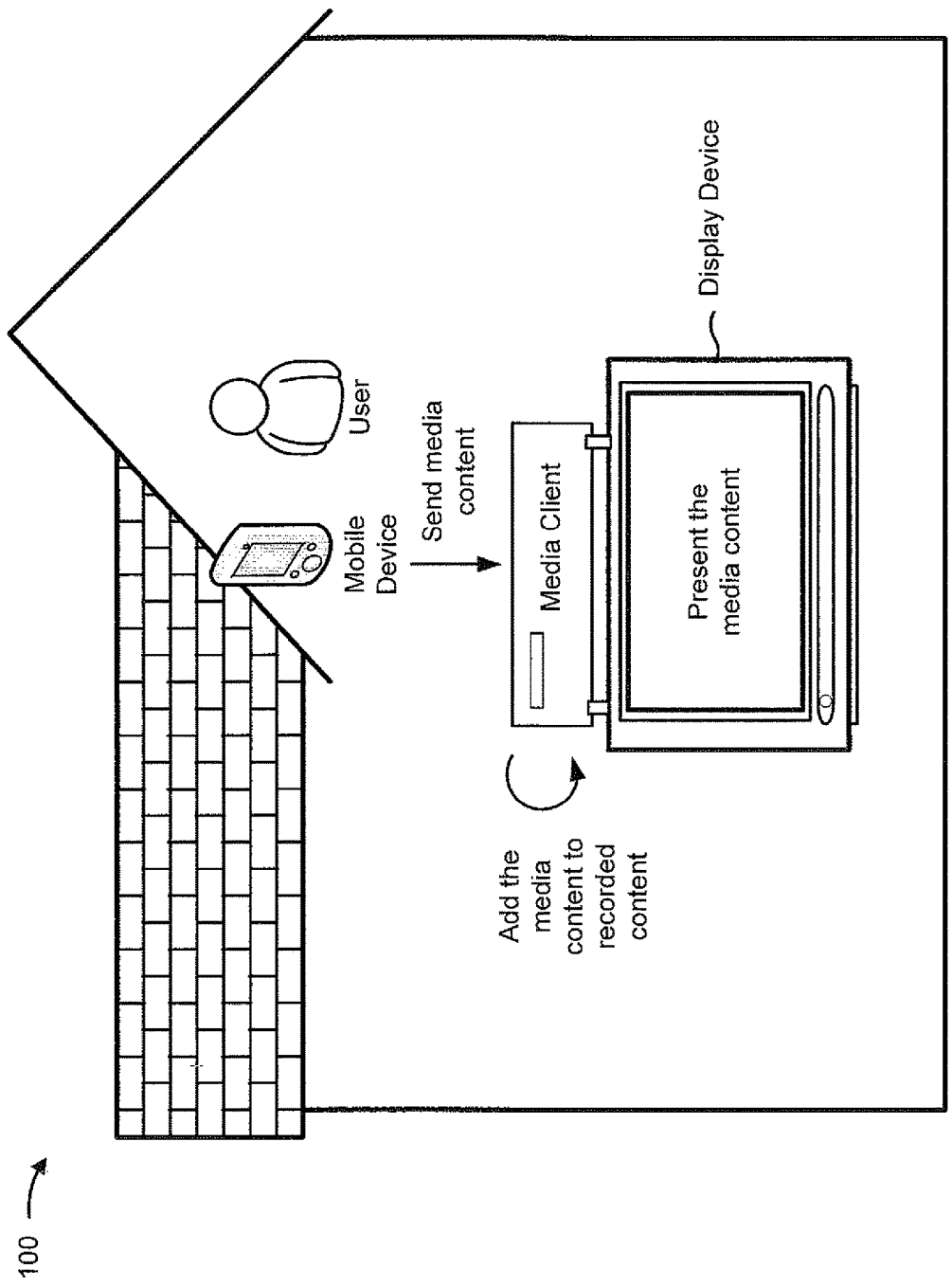
FIG. 1 is a diagram of an overview of an example implementation described herein.

FIG. 1 is a diagram of an overview of an example implementation 100 described herein. In FIG. 1, assume a mobile device stores media content. Further, assume the mobile device detects a media client nearby. For example, the mobile device may detect the media client using Near Field Communication (NFC) or may detect that the media client is in a same wireless network as the mobile device (e.g., a Wi-Fi network).

As shown in FIG. 1, the mobile device may send the media content to the media client. The mobile device may also send metadata associated with the media content to the media client. The media client may receive the media content and/or the metadata and store the media content and/or the metadata in a memory included in or accessible by the media client. In some implementations, the media client may store the media content in a same memory as media content recorded by the media client (e.g., a television program recorded by a DVR).

The media client may generate an EPG based on the metadata associated with the media content and cause a display device to present the EPG. For example, the EPG may display a list of recorded media content, including the media content, and the metadata may be used to generate program information for the media content that is displayed in the EPG. The user may input a selection, via the media client, to present the media content. The media client may receive the selection and cause the display device to present the media content (e.g., which originated from the mobile device).

In this way, a media client may present, to a user, media content that was received from a mobile device.

Figure 2:
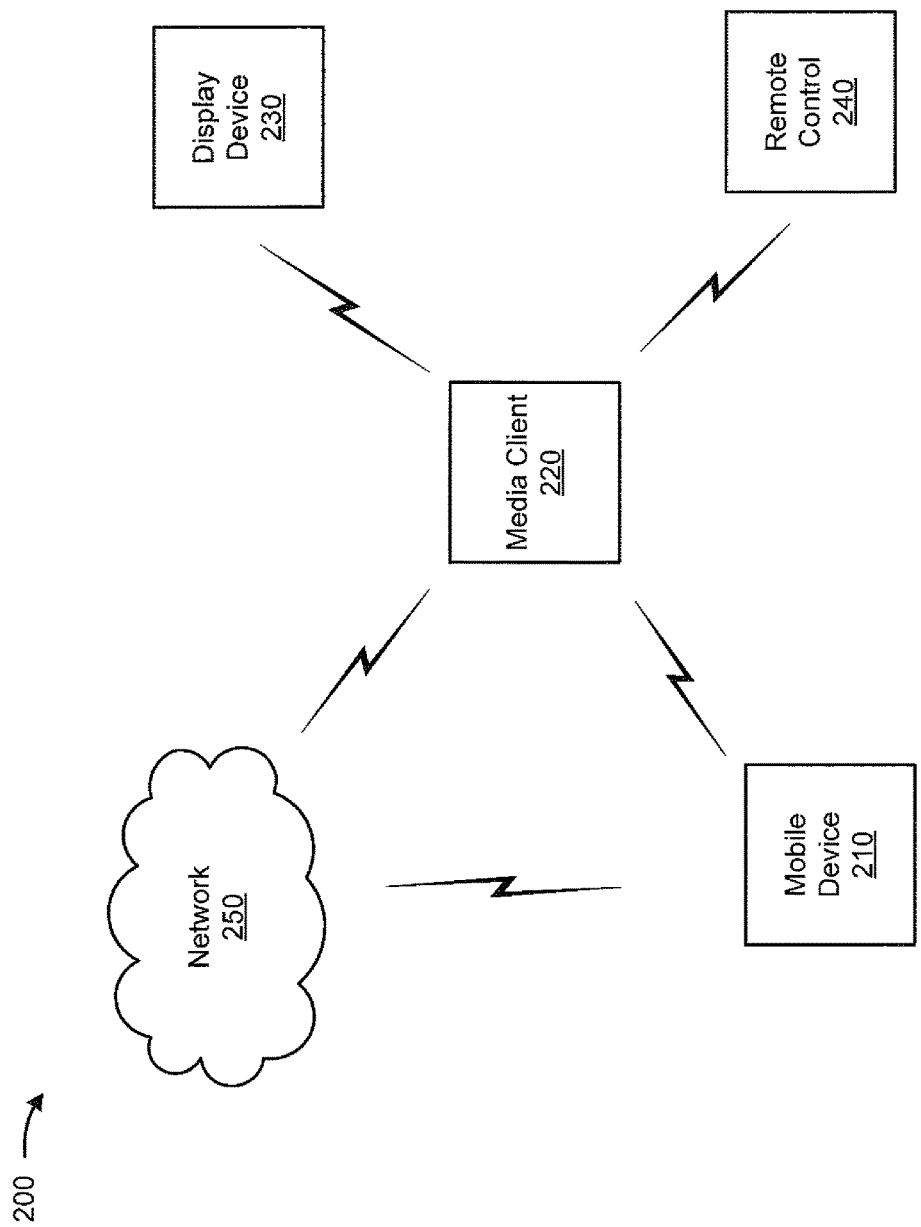
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 210, a media client 220, a display device 230, a remote control 240, and/or a network 250. Devices of environment 200 may interconnect via wired connections, wireless connections, or a combination of wired and wireless connections.

Mobile device 210 may include a device capable of receiving, processing, and/or providing information. For example, mobile device 210 may include a mobile phone (e.g., a smart phone, a radiotelephone, etc.), a computing device (e.g., a laptop computer, a tablet computer, a handheld computer, a gaming device, etc.), or a similar device. In some implementations, mobile device 210 may include a communication interface that allows mobile device 210 to receive information from and/or transmit information to another device in environment 200. For example, mobile device 210 may include a Radio Frequency Identification (RFID) chip (e.g., a NFC chip) for communicating with media client 220 and/or another device in environment 200. As used herein, the term "mobile RFID chip" may refer to a RFID chip included in mobile device 210.

Media client 220 may include a device capable of receiving, transmitting, and/or processing multimedia content and providing the multimedia content to a user (e.g., via a television or other display device 230). Examples of media client 220 may include a set-top box, a casting stick (e.g., a high-definition media interface (HDMI) dongle), a computer, a cable card, a gaming device, a portable electronic device, and/or another type of device capable of receiving, transmitting, and/or processing multimedia content and providing the multimedia content to a user. In some implementations, media client 220 may include a RFID chip (e.g., a NFC chip) for communicating with mobile device 210 and/or another device in environment 200. As used herein, the term "media RFID chip" may refer to a RFID chip included in media client 220.

Display device 230 may include any digital or analog display that is capable of presenting audio and/or video content provided by media client 220. Display device 230 may include technologies, such as cathode ray tube (CRT) displays, liquid crystal displays (LCDs), light-emitting diode (LED) displays, plasma displays, etc. Examples of display device 230 may include a television, a projector, a computer monitor, and/or another type of device capable of presenting audio and/or video content.

Remote control 240 may include a device that allows a user to control programming, applications, and/or content displayed on display device 230 via interaction with media client 220. Remote control 240 may transmit signals, such as, for example, infrared signals, to a signal receiver associated with media client 220. Remote control 240 may take the form of a standard remote, a keyboard, a smart phone, etc. Any function, described herein, as being performed by remote control 240, may be performed directly on media client 220 using, for example, one or more buttons on media client 220.

Network 250 may include one or more wired and/or wireless networks. For example, network 250 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
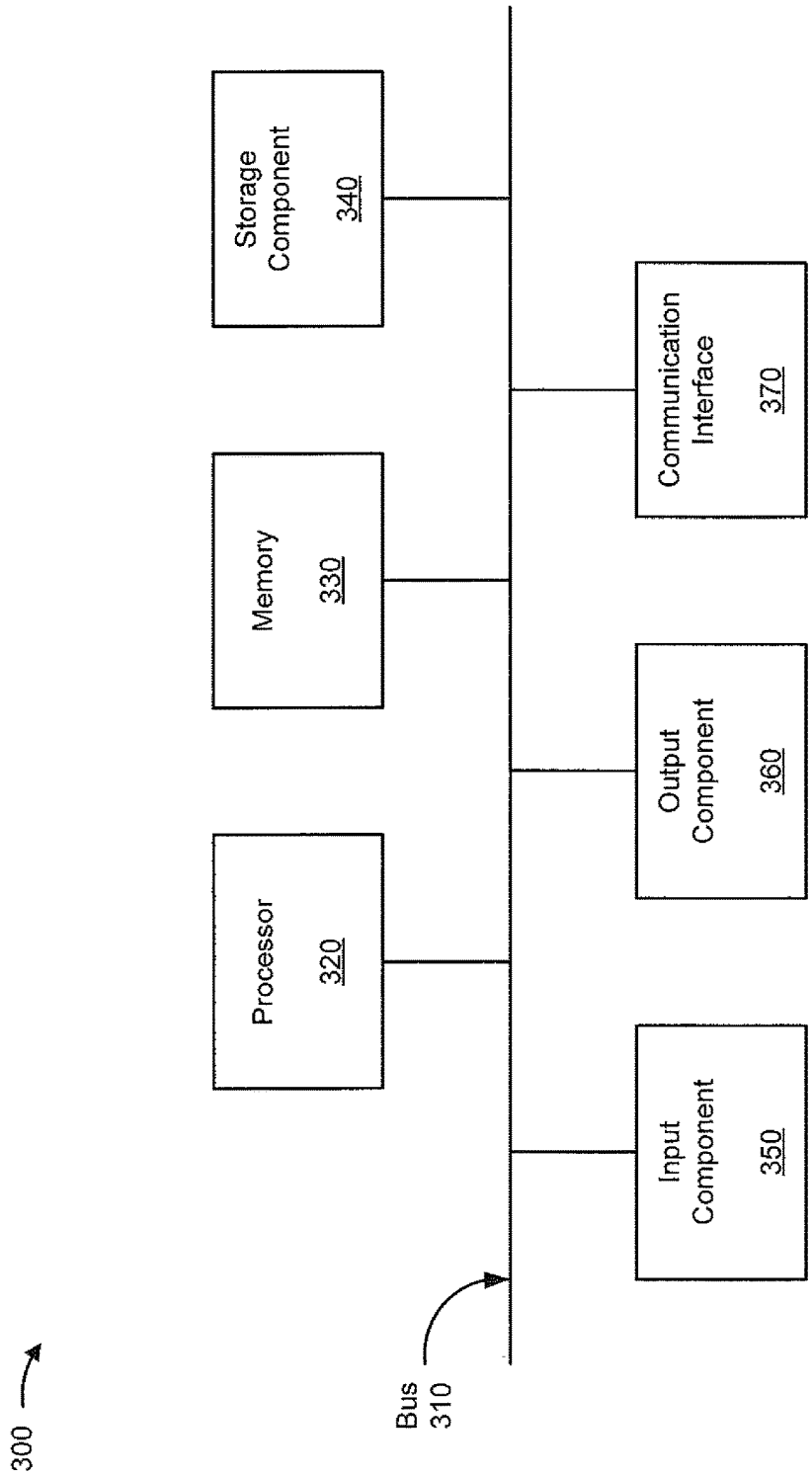
FIG. 3 is a diagram of example components of one or more devices of FIG. 2.

FIG. 3 is a diagram of example components of a device 300. Device 300 may correspond to mobile device 210, media client 220, display device 230, and/or remote control 240. In some implementations, mobile device 210, media client 220, display device 230, and/or remote control 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a camera, a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface (e.g., RFID, NFC, Bluetooth, etc.), a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
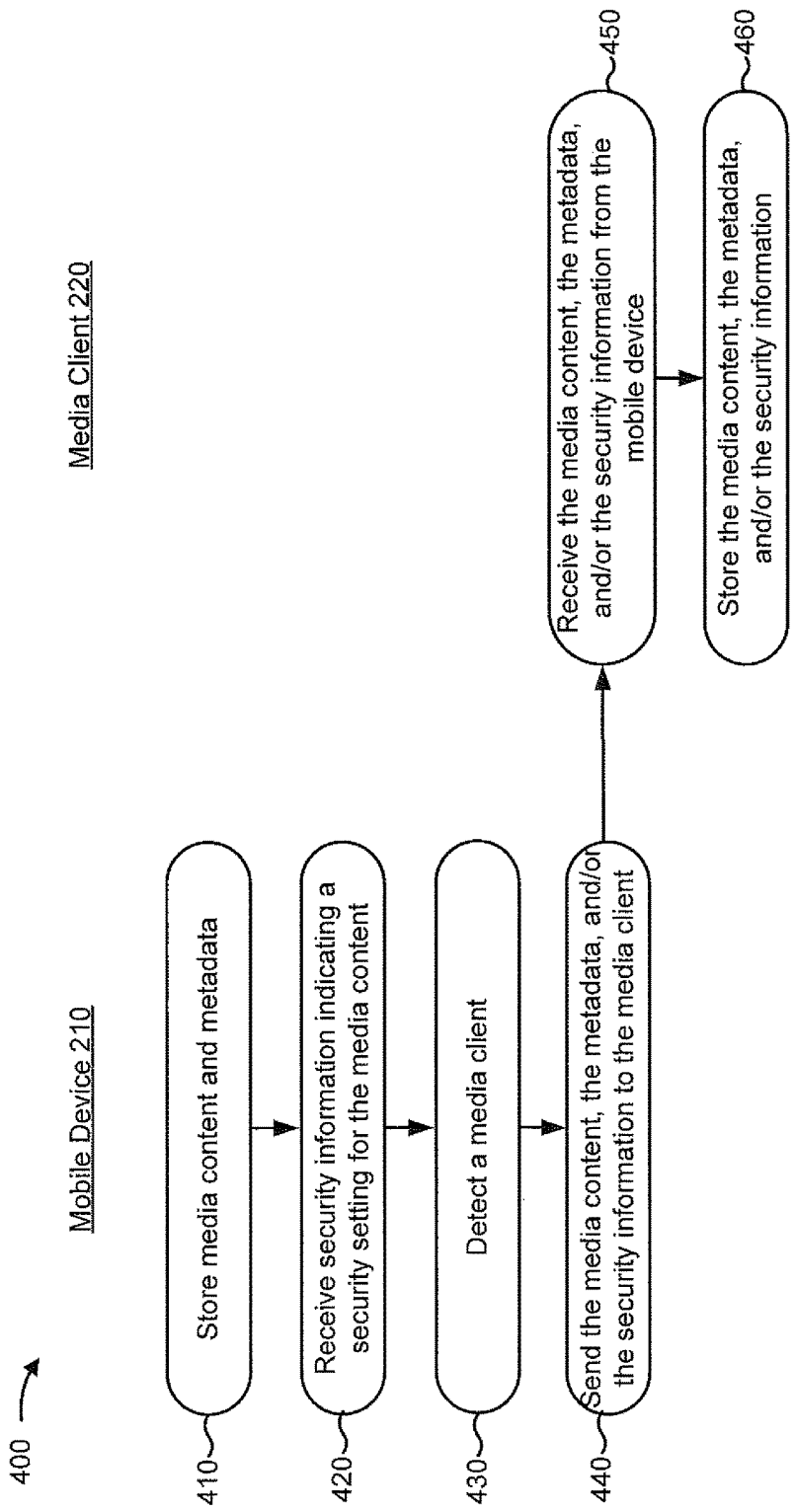
FIG. 4 is a flow chart of an example process for sending media content from a mobile device to a media client.

FIG. 4 is a flow chart of an example process 400 for sending media content from mobile device 210 to media client 220. In some implementations, one or more process blocks of FIG. 4 may be performed by mobile device 210 and/or media client 220. In some implementations, one or more process blocks of FIG. 4 may be performed by another device or a group of devices separate from or including mobile device 210 and/or media client 220, such as display device 230 and/or remote control 240.

As shown in FIG. 4, process 400 may include storing media content and metadata (block 410). For example, mobile device 210 may store the media content and the metadata in a memory included in or accessibly by mobile device 210.

The media content may include audio data, video data, image data, and/or other media data. For example, the media content may include a song, a picture, a video (e.g., a home video, a movie, a television program, etc.), or the like. The metadata may include information about the media content. For example, the metadata may indicate a title of the media content, a date the media content was created, a length of the media content, a content type of the media content, production information for the media content, actor and/or artist information for the media content, a description of the media content, a location associated with the media content, etc.

In some implementations, mobile device 210 may use input component 350 (e.g., a microphone, a camera, etc.) to record and store the media content. Mobile device 210 may generate metadata for the media content based on recording the media content and/or based on user input. For example, mobile device 210 may generate metadata indicating the time and/or location the media content is recorded, and a user may input a title of the media content into mobile device 210.

In some implementations, mobile device 210 may receive the media content from another device. For example, mobile device 210 may receive the media content via a network (e.g., the Internet) and/or via a wired or wireless connection with another device.

As further shown in FIG. 4, process 400 may include receiving security information indicating a security setting for the media content (block 420). For example, mobile device 210 may receive the security information.

In some implementations, the security setting may include a transfer setting for sending the media content and/or the metadata to media client 220.

For example, the transfer setting may restrict the type of communication method that may be used to send the media content and/or the metadata to media client 220. For example, the transfer setting may allow the media content and/or the metadata to be sent to media client 220 via a first type of communication (e.g., Bluetooth, Wi-Fi, a wired connection, etc.), but prohibit sending the media content via a second type of communication (e.g., 3G, LTE, etc.).

Additionally, or alternatively, the transfer setting may condition transfer of the media content and/or the metadata to media client 220 on mobile device 210 establishing RFID communication with media client 220. In some implementations, the transfer setting may indicate that based on the RFID communication with media client 220, mobile device 210 should handover communication to another type of communication (e.g., Bluetooth, Wi-Fi, etc.) to transfer the media content and/or the metadata. For example, the RFID communication may be used to exchange authentication information to communicate using the other type of communication.

Additionally, or alternatively, the transfer setting may indicate whether the media content and/or the metadata may be automatically sent to media client 220 based on mobile device 210 detecting media client 220. For example, mobile device 210 may be capable of automatically detecting whether media client 220 is connected to a same network (e.g., a Wi-Fi network) as mobile device 210. In some implementations, the transfer setting may indicate to automatically transfer the media content and/or the metadata to media client 220 via the network without user input when mobile device 210 and media client 220 are connected to the same network. On the other hand, the transfer setting may indicate to wait for user input before sending the media content and/or the metadata to media client 220 via the network.

Additionally, or alternatively, the transfer setting may indicate whether authentication information is required before mobile device 210 may send the media content and/or the metadata to media client 220. For example, the transfer setting may indicate the media content and/or the metadata may not be sent to media client 220 until the authentication information (e.g., a passcode, a password, a personal identification number (PIN), biometric information, etc.) is input by a user into mobile device 210. The authentication information may be user customizable.

Additionally, or alternatively, the transfer setting may indicate that a particular portion of the metadata, associated with the media content, may not be transferred. For example, information identifying a location where the media content was recorded may not be transferred.

Additionally, or alternatively, the transfer setting may prohibit sending the media content and/or the metadata to media client 220.

In some implementations, the security information may indicate a playback setting for presenting the media content and/or the metadata via media client 220.

For example, the playback setting may indicate that media client 220 may not present the media content and/or the metadata until authentication information is input by a user into media client 220 (e.g., a passcode, a password, a PIN, biometric information, etc.). The authentication information may be user customizable.

Additionally, or alternatively, the playback setting may indicate that media client 220 may only present the media content and/or the metadata while mobile device 210 is wirelessly connected to media client 220. For example, the playback setting may require media client 220 and mobile device 210 have an active RFID connection, Bluetooth connection, Wi-Fi connection, etc. during play back of the media content and/or the metadata. Such a playback setting may keep play back of the media content secure (e.g., by only allowing play back when mobile device 210 is nearby), while allowing media client 220 to present the media content without mobile device 210 being required to simultaneously display the media content. Accordingly, mobile device 210 may be used for other purposes while the media content is presented by media client 220 unlike mirroring.

Additionally, or alternatively, the playback setting may indicate an amount of time media client 220 is permitted to store the media content and/or the metadata. For example, the playback setting may indicate that media client 220 should delete the media content and/or the metadata at a certain time and/or after a certain amount of time has passed since the media content and/or the metadata was sent to media client 220. Additionally, or alternatively, the playback setting may indicate a number of times the media content may be played back by media client 220.

In some implementations, mobile device 210 may receive the security information via user input. Additionally, or alternatively, mobile device 210 may receive the security information from another device included in environment 200. Additionally, or alternatively, mobile device 210 may store default security information.

As further shown in FIG. 4, process 400 may include detecting media client 220 (block 430). For example, mobile device 210 may detect media client 220.

In some implementations, mobile device 210 may use a mobile RFID chip included in mobile device 210 to detect a media RFID chip included in media client 220. The media RFID chip may have access to a media client identifier stored in a memory included in or accessible by the media RFID chip. The media client identifier may indicate that the media RFID chip is included in a media client 220 and is not a RFID chip included in another kind of device. The mobile RFID chip may read the media client identifier and confirm that the media RFID chip is a chip included in a media client 220 based on the media client identifier.

In some implementations, mobile device 210 may detect media client 220 using another RF communication method, such as Wi-Fi or Bluetooth.

In some implementations, mobile device 210 may detect that media client 220 is located within proximity to the mobile device 210 when mobile device 210 may communicate directly with media client 220 (e.g., via NFC, RFID communication, Bluetooth, and/or other short range RF communication) or indirectly with media client 220 via a local wireless network (e.g., a Wi-Fi network).

As further shown in FIG. 4, process 400 may include sending the media content, the metadata, and/or the security information to media client 220 (block 440). For example, mobile device 210 may send the media content, the metadata, and/or the security information to media client 220 based on detecting media client 220.

In some implementations, mobile device 210 may send the media content and/or the metadata to media client 220 based on the transfer setting included in the security information.

For example, mobile device 210 may use a permitted type of communication, as indicated by the transfer setting, to send the media content and/or the metadata to media client 220. Additionally, or alternatively, mobile device 210 may establish a RFID connection with media client 220, handover communication to another type of communication (e.g., Bluetooth, Wi-Fi, etc.), and transfer the media content and/or the metadata using the other type of communication. Additionally, or alternatively, mobile device 210 may automatically send the media content and/or the metadata based on detecting that media client 220 is connected to a same network as mobile device 210. In some implementations, mobile device 210 may not send a particular portion of the metadata identified by the transfer setting.

In some implementations, mobile device 210 may prompt a user of mobile device 210 to input authentication information based on the transfer setting. The user may input the authentication information into mobile device 210, and mobile device 210 may send the media content and/or the metadata to media client 220 if the input authentication information matches stored authentication information indicated by the transfer setting.

In some implementations, mobile device 210 may send the security information to media client 220. In some implementations, mobile device 210 may send the playback setting to media client 220, but not send the transfer setting to media client 220.

As further shown in FIG. 4, process 400 may include receiving the media content, the metadata, and/or the security information from mobile device 210 (block 450). For example, media client 220 may receive the media content, the metadata, and/or the security information from mobile device 210.

As further shown in FIG. 4, process 400 may include storing the media content, the metadata, and/or the security information (block 460). For example, media client 220 may store the media content, the metadata, and/or the security information in a memory included in or accessible by mobile device 210.

In some implementations, media client 220 may include a DVR function that records media content (e.g., television programs, movies, etc.) received via a source signal from a service provider (e.g., a cable television provider). Media client 220 may store the media content in a same memory that stores the media content recorded by media client 220.

In some implementations, media client 220 may store the media content and/or the metadata received from mobile device 210 for a particular amount of time indicated by the security information (e.g., as indicated by the playback setting). Media client 220 may delete the media content and/or the metadata after the particular amount of time.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for presenting media content received from mobile device 210. In some implementations, one or more process blocks of FIG. 5 may be performed by media client 220. In some implementations, one or more process blocks of FIG. 5 may be performed by another device or a group of devices separate from or including media client 220, such as mobile device 210, display device 230, and/or remote control 240.

As shown in FIG. 5, process 500 may include generating an EPG based on the metadata for the media content (block 510). For example, media client 220 may generate the EPG or modify a stored EPG based on the metadata.

The EPG may include an interactive program guide (IPG) that allows a user to interact with the EPG. In some implementations, the EPG may include a menu for recorded media content (e.g., programs recorded by a DVR) and/or media content received from mobile device 210. The menu may include the metadata for the media content received from mobile device 210. For example, the menu may include a title of the media content, a date the media content was created, a length of the media content, a content type of the media content, production information for the media content, actor and/or artist information for the media content, a description of the media content, a location associated with the media content, or the like. In other words, the media client 220 may generate program information for the media content received from mobile device 210 based on the metadata, and the EPG may display the program information for the media content.

Additionally, or alternatively, the EPG may indicate whether media content is recorded media content or media content received from mobile device 210. For example, the EPG may use a particular icon or another way of visually distinguishing media content, received from mobile device 210, from recorded media content In some implementations, media client 220 may generate and store the EPG in a memory included in or accessible by media client 220.

As further shown in FIG. 5, process 500 may include causing the EPG to be presented by display device 230 (block 520). For example, media client 220 may cause the EPG to be presented by display device 230.

In some implementations, a user may input an instruction to display the EPG into remote control 240. Remote control 240 may send the instruction to media client 220. Media client 220 may receive the instruction and send the EPG to display device 230 for display based on the instruction. Display device 230 may receive the EPG and display the EPG.

As further shown in FIG. 5, process 500 may include receiving a selection to present the media content based on the EPG (block 530). For example, media client 220 may receive the selection to present the media content.

The user may input a selection to present media content (e.g., media content received from mobile device 210) into remote control 240. Remote control 240 may send the selection to media client 220 and media client 220 may receive the selection.

As further shown in FIG. 5, process 500 may include determining whether the media content may be presented based on the security information (block 540). For example, media client 220 may determine whether the media content satisfies the playback setting included in the security information.

In some implementations, the security information (e.g., the playback setting) may indicate that media client 220 may not present the media content and/or the metadata until authentication information is input by a user into media client 220 (e.g., a passcode, a password, a PIN, etc.). Accordingly, media client 220 may prompt the user, via the EPG and display device 230, to input authentication information based on the security information. The user may input authentication information into remote control 240 and remote control 240 may send the authentication information to media client 220. Media client 220 may receive the authentication information input by the user. Additionally, or alternatively, the user may input the authentication information into mobile device 210 and mobile device 210 may send the authentication information to media client 220. Media client 220 may compare the received authentication information to stored authentication information indicated by the playback setting. If the received authentication information matches the stored authentication information, media client 220 may determine the media content may be presented to the user. On the other hand, if the received authentication information does not match the stored authentication information, media client 220 may determine the media content may not be presented to the user.

In some implementations, the security information (e.g., the playback setting) may indicate that media client 220 may only present the media content and/or the metadata while mobile device 210 is wirelessly connected to media client 220. For example, the playback setting may require media client 220 and mobile device 210 have an active RFID connection, Bluetooth connection, Wi-Fi connection, etc. during play back of the media content and/or the metadata. Accordingly, media client 220 may determine whether mobile device 210 is wirelessly connected to media client 220 based on the security information. For example, mobile device 210 may wirelessly connect to media client 220 and exchange identification information, and media client 220 may determine mobile device 210 is connected to media client 220 based on the identification information. If the media client 220 determines mobile device 210 is wirelessly connected to media client 220 (e.g., via NFC, Bluetooth, Wi-Fi, etc.), media client 220 may determine that the media content may be presented to the user. On the other hand, if media client 220 determines mobile device 210 is not wirelessly connected to media client 220, media client 220 may determine that the media content may not be presented to the user.

As further shown in FIG. 5, process 500 may include selectively causing the media content to be presented by display device 230 (block 550). For example, media client 220 may cause the media content to be presented if the security information is satisfied or may prevent the media content from being presented if the security information is not satisfied.

If media client 220 determines the media content may be presented to the user (e.g., the security information is satisfied), media client 220 may provide the media content to be presented on display device 230. In some implementations, media client 220 may also cause display device 230 to display metadata associated with the media content while the media content is displayed (e.g., a title of the media content may be displayed while the media content is presented). Display device 230 may receive the media content and/or the metadata and display the media content and/or the metadata. The user may control play back of the media content using remote control 240 and/or media client 220. For example, the user may play, pause, rewind, fast forward, etc. the media content received from mobile device 210 using remote control 240.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
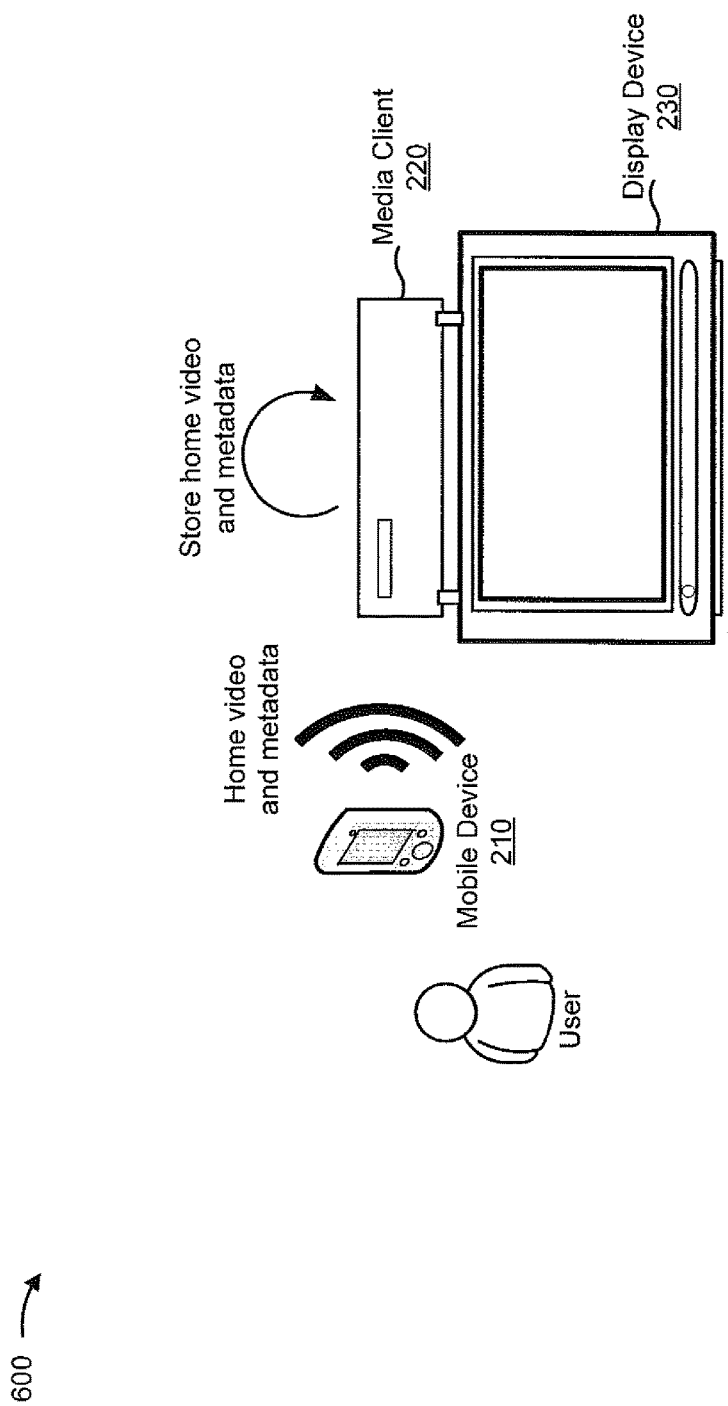
Figure 6C:
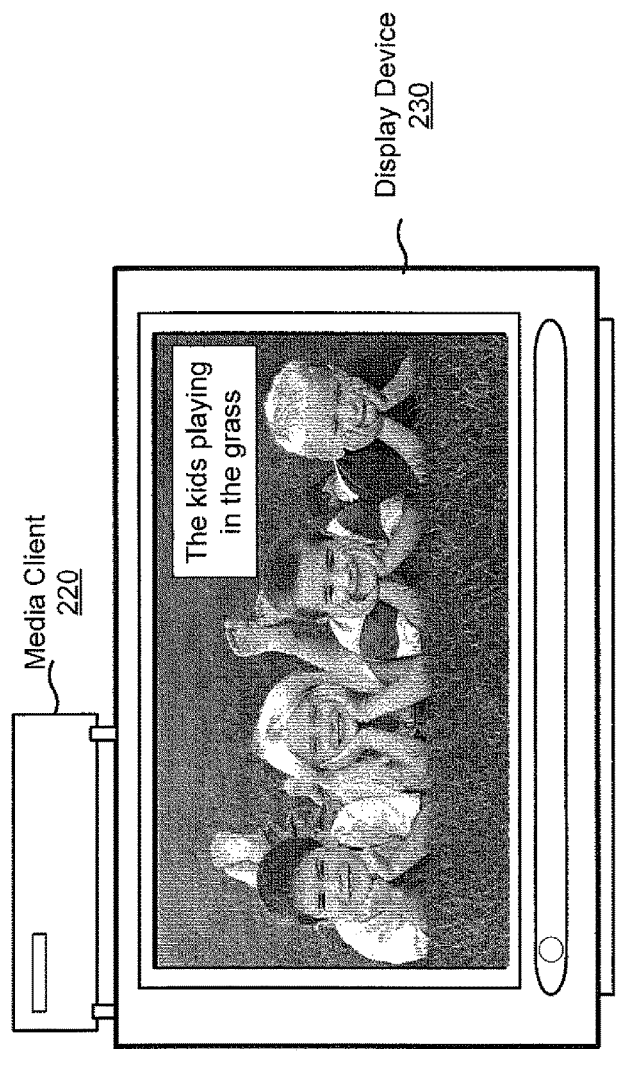

FIGS. 6A-6C are diagrams of an example implementation 600 relating to example process 400 shown in FIG. 4 and process 500 shown in FIG. 5. FIGS. 6A-6C show an example of sending media content from mobile device 210 to media client 220, and presenting the media content received from mobile device 210.

In FIG. 6A, assume mobile device 210 stores a home video. For example, a user may have used mobile device 210 to record a video of the user's children. Further, assume the user inputs a title of the home video (e.g., "Kids Playing") and a description of the video (e.g., "the kids playing in the grass"). Assume mobile device 210 stores the title and the description as metadata associated with the home video.

As shown in FIG. 6A, mobile device 210 may detect media client 220 (e.g., using NFC or Bluetooth). Mobile device 210 may transmit the home video and the metadata to media client 220 using NFC or Bluetooth. Media client 220 may receive the home video and the metadata from mobile device 210, and store the home video and the metadata in a local memory included in media client 220.

As shown in FIG. 6B, media client 220 may generate an EPG based on the metadata (e.g., the title of the home video). For example, the EPG may include a menu indicating recorded media content stored my media client 220. The menu may indicate media content recorded by media client 220 (e.g., "Television Program A" and "Movie B") and media content received from mobile device 210 (e.g., the home video titled "Kids Playing"). Media client 220 may cause display device 230 to display the EPG.

As further shown in FIG. 6B, a user may operate remote control 240 to send an instruction to media client 220 to present the home video by selecting the "Kids Playing" box in the EPG. Media client 220 may receive the instruction from remote control 240.

As shown in FIG. 6C, media client 220 may cause display device 230 to display the home video based on the instruction from remote control 240. Additionally, media client 220 may cause display device 230 to display the description of the home video (e.g., "the kids playing in the grass"). The user may then control play back (e.g., pausing, rewinding, fast forwarding, etc.) of the home video using remote control 240.

As indicated above, FIGS. 6A-6C are provided merely as an example. Other examples are possible and may differ from what was described with regard to FIGS. 6A-6C.

Implementations described herein may transmit media content and metadata from a mobile device to a media client (e.g., a set-top box) allowing the media client to store the media content and the metadata. Additionally, or alternatively, implementations described herein may allow a remote control associated with the media client to control play back of the media content received from the mobile device. Moreover, implementations described herein may generate an electronic program guide (EPG), based on the metadata for the media content, to be presented to a user. Furthermore, implementations described herein may allow the media client to present the media content without the mobile device simultaneously presenting the media content.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive security information from a mobile device,
the security information including:
a first setting associated with presenting media content, to be received from the mobile device, on a display device, and
a second setting associated with restricting a type of communication method to be used to transfer the media content and metadata, associated with the media content, from the mobile device to the device,
the first setting indicating that the display device is to present the media content, to be received from the mobile device, without the mobile device simultaneously presenting the media content,
the second setting indicating that the media content and the metadata are to be transferred from the mobile device to the device via a first communication method, and
the second setting indicating that the media content and the metadata are prohibited from being transferred from the mobile device to the device via a second communication method that is different than the first communication method;
receive, based on the second setting, the media content and the metadata from the mobile device when the mobile device and the device are communicating via the first communication method,
the metadata received from the mobile device including location information associated with the media content received from the mobile device,
the location information indicating a location where the media content, received from the mobile device, was recorded;
store the media content, the security information, and the metadata received from the mobile device;
generate an electronic program guide based on the metadata received from the mobile device,
the electronic program guide including information regarding the media content received from the mobile device;
cause the display device to present the electronic program guide;
receive, based on the electronic program guide and from a remote control associated with the device, an instruction to present the media content, received from the mobile device, on the display device,
the remote control being different from the mobile device;
determine, based on receiving the instruction from the remote control, whether the media content, received from the mobile device, is permitted to be presented on the display device in accordance with the first setting; and
cause, based on the first setting, the display device to present the media content, received from the mobile device, when the media content, received from the mobile device, is permitted to be presented on the display device, and without the mobile device simultaneously presenting the media content.

2. The device of claim 1, where the one or more processors are further to:
permit the remote control to control play back of the media content received from the mobile device.

3. The device of claim 1, where the one or more processors are further to:
cause the display device to present the metadata received from the mobile device while displaying the media content received from the mobile device.

4. The device of claim 1, where the one or more processors, when receiving the media content and the security information, are to:
receive at least one of the media content or the security information via Radio Frequency Identification (RFID) communication.

5. The device of claim 1, where the one or more processors are further to:
establish a Radio Frequency Identification (RFID) communication with the mobile device; and
activate another type of communication based on establishing the RFID communication,
the other type of communication being different than the RFID communication; and
where the one or more processors, when receiving the media content and the security information, are to:
receive the media content and the security information from the mobile device via the other type of communication.

6. The device of claim 1, where the security information indicates that authentication information is to be received before causing the display device to present the media content;
where the one or more processors are further to:
receive additional authentication information via the remote control; and
where the one or more processors, when determining whether the media content, received from the mobile device, is permitted to be presented on the display device, are to:
determine whether the media content, received from the mobile device, is permitted to be presented on the display device based on the additional authentication information and the authentication information indicated by the security information.

7. The device of claim 1, where the security information indicates that the mobile device is to be wirelessly connected to the device for the media content, received from the mobile device, to be permitted to be presented on the display device;
where the one or more processors are further to:
determine whether the mobile device is wirelessly connected to the device; and
where the one or more processors, when determining whether the media content, received from the mobile device, is permitted to be presented on the display device, are to:
determine whether the media content, received from the mobile device, is permitted to be presented on the display device based on whether the mobile device is wirelessly connected to the device.

8. The device of claim 1, where the security information indicates the media content, received from the mobile device, is not to be stored by the device after a particular amount of time, and
where the one or more processors are further to:
delete the media content, received from the mobile device, after the particular amount of time.

9. A non-transitory computer-readable medium storing instructions, the instructions comprising:
one or more instructions that, when executed by one or more processors of a device, cause the one or more processors to:
receive security information from a mobile device,
the security information including:
a first setting associated with presenting media content, to be received from the mobile device, on a display device at a first time, and
a second setting associated with restricting a type of communication method to be used to transfer the media content and metadata, associated with the media content, from the mobile device to the device,
the first setting indicating that the display device is to present the media content, to be received from the mobile device, without the mobile device simultaneously presenting the media content,
the second setting indicating that the media content and the metadata are to be transferred from the mobile device to the device via a first communication method, and
the second setting indicating that the media content and the metadata are prohibited from being transferred from the mobile device to the device via a second communication method that is different than the first communication method;
receive, based on the second setting, the media content and the metadata from the mobile device when the mobile device and the device are communicating via the first communication method, the metadata received from the mobile device including location information associated with the media content received from the mobile device,
the location information indicating a location where the media content, received from the mobile device, was recorded;
store the media content, the security information, and the metadata received from the mobile device;
generate an electronic program guide based on the metadata received from the mobile device,
the electronic program guide including information regarding the media content received from the mobile device;
cause the display device to present the electronic program guide;
receive, based on the electronic program guide and from a remote control associated with the device, an instruction to present the media content, received from the mobile device, on the display device,
the remote control being different from the mobile device;
determine, based on receiving the instruction from the remote control, whether the media content, received from the mobile device, is permitted to be presented on the display device in accordance with the first setting; and
cause, based on the first setting, the media content, received from the mobile device, to be presented on the display device, when the media content, received from the mobile device, is permitted to be presented on the display device, and without the mobile device simultaneously presenting the media content.

10. The non-transitory computer-readable medium of claim 9, where the one or more instructions, that cause the one or more processors to receive the metadata from the mobile device, cause the one or more processors to:
receive the metadata from the mobile device based on the first setting included in the security information.

11. The non-transitory computer-readable medium of claim 9, where the second setting indicates that a Radio Frequency Identification (RFID) connection is to be established with the mobile device before receiving the media content;
where the one or more instructions, when executed by the one or more processors, further cause the one or more processors to:
establish the RFID connection with the mobile device; and
where the one or more instructions, that cause the one or more processors to receive the media content from the mobile device, cause the one or more processors to:
receive the media content from the mobile device based on establishing the RFID connection with the mobile device.

12. The non-transitory computer-readable medium of claim 11, where the one or more instructions, when executed by the one or more processors, further cause the one or more processors to:
establish another type of communication with the mobile device based on establishing the RFID connection,
the other type of communication being different than the RFID connection; and
where the one or more instructions, that cause the one or more processors to receive the media content from the mobile device based on the RFID connection, cause the one or more processors to:
receive the media content from the mobile device using the other type of communication.

13. The non-transitory computer-readable medium of claim 9, where the one or more instructions, that cause the one or more processors to receive the security information, cause the one or more processors to:
receive the security information via user input.

14. A method, comprising:
receiving, by a device and from a mobile device, security information including:
a first setting associated with presenting media content, to be received from the mobile device, on a display device, and
a second setting associated with restricting a type of communication method to be used to transfer the media content and metadata, associated with the media content, from the mobile device to the device,
the first setting indicating that the display device is to present the media content, to be received from the mobile device, without the mobile device simultaneously presenting the media content,
the second setting indicating that the media content and the metadata are to be transferred from the mobile device to the device via a first communication method, and
the second setting indicating that the media content and the metadata are prohibited from being transferred from the mobile device to the device via a second communication method that is different than the first communication method;
receiving, by the device and based on the second setting, the media content and the metadata from the mobile device when the mobile device and the device are communicating via the first communication method,
the metadata received from the mobile device including location information associated with the media content received from the mobile device,
the location information indicating a location where the media content, received from the mobile device, was recorded;
storing, by the device, the media content, the metadata, and the security information received from the mobile device;
generating, by the device, an electronic program guide based on the metadata received from the mobile device,
the electronic program guide including information regarding the media content received from the mobile device;
causing, by the device, the display device to present the electronic program guide;
receiving, by the device from a remote control and based on the electronic program guide, an instruction to present the media content, received from the mobile device, on the display device,
the remote control being different from the mobile device;
determining, by the device based on receiving the instruction from the remote control, whether the media content, received from the mobile device, is permitted to be presented on the display device in accordance with the first setting; and
causing, by the device, the media content, received from the mobile device, to be presented on the display device when the media content, received from the mobile device, is permitted to be presented on the display device, and without the mobile device simultaneously presenting the media content.

15. The method of claim 14, where the first setting indicates that the media content, the metadata, and the security information are to be automatically received by the device based on detecting that the device is connected to a same wireless network as the mobile device;

where the method further comprises:

detecting that the device is connected to the same wireless network to which the mobile device is connected; and where receiving the media content, the metadata, and the security information from the mobile device comprises:

automatically receiving the media content, the metadata, and the security information from the mobile device based on detecting that the device is connected to the same wireless network to which the mobile device is connected.

16. The method of claim 14, where the first setting indicates that authentication information is to be received by the mobile device before the media content, the metadata, and the security information are received by the device, and where receiving the media content, the metadata, and the security information from the mobile device comprises:

receiving the media content, the metadata, and the security information from the mobile device when the authentication information is received by the mobile device.

17. The method of claim 14, where the first setting indicates that a particular part of the metadata is not to be received by the device, and where the method further comprises:

preventing the particular part of the metadata from being received by the device based on the first setting.

18. The method of claim 14, further comprising:

wirelessly connecting, by the device, to the mobile device after receiving the media content, the metadata, and the security information; and causing play back of the media content, received from the mobile device, via the device based on wirelessly connecting to the mobile device.

19. The method of claim 14, where the second setting further indicates that authentication information is to be received by the device before causing the display device to present the media content received from the mobile device;

where the method further comprises:

receiving the authentication information; and where causing the media content, received from the mobile device, to be presented on the display device comprises:

causing the media content, received from the mobile device, to be presented on the display device based on receiving the authentication information.

20. The non-transitory computer-readable medium of claim 9, where the first setting further indicates that the media content, received from the mobile device, is presented only while the mobile device being wirelessly connected to the device; and where the one or more instructions, that cause the one or more processors to cause the media content, received from the mobile device, to be presented on the display device, are to:

cause the media content, received from the mobile device to be presented on the display device based on the first setting.

* * * * *